United States Patent [19]
Cunningham et al.

[11] Patent Number: 6,039,104
[45] Date of Patent: Mar. 21, 2000

[54] DUAL PURPOSE CLAMP FOR RIM HOLDING TIRE CHANGERS

[75] Inventors: Charles L. Cunningham, Nashville; Robert E. Gwaltney, Brentwood, both of Tenn.

[73] Assignee: Hennessy Industries, Inc., La Vergne, Tenn.

[21] Appl. No.: 09/036,633

[22] Filed: Mar. 6, 1998

[51] Int. Cl.⁷ .................................................. B60C 25/00
[52] U.S. Cl. ................................. 157/21; 157/16; 269/88
[58] Field of Search ................................. 157/14, 16–21; 269/88, 203

[56] References Cited

U.S. PATENT DOCUMENTS

| | | | |
|---|---|---|---|
| 1,819,428 | 8/1931 | Manley | 157/16 |
| 2,209,713 | 7/1940 | Campbell et al. | 157/17 |
| 3,923,090 | 12/1975 | Kinney | 157/1.5 |

*Primary Examiner*—D. S. Meislin
*Attorney, Agent, or Firm*—Waddey & Patterson; I. C. Waddey, Jr.

[57] ABSTRACT

A dual purpose clamp for use in connection with rim holding tire changers. The clamp includes a base, a body and claws for gripping the rim of a tire. In the preferred embodiment, the base is generally L-shaped and includes perpendicular legs comprising spaced apart walls which define interior channels. Rails are mounted along a portion of the inner surface of the walls of each leg, and are configured to slidably engage oppositely disposed channels formed on the clamp carriers of the tire changer. Each leg of the base further includes a bore formed therein and configured to receive a locking pin for releasably securing the clamp to the clamp carrier in the desired position. First and second claws are attached to the body opposite the base. The first claw is configured to accommodate a first rim type, and the second claw is configured to accommodate a second rim type. The second claw is preferably disposed ninety degrees from the first claw so that the clamp may be reoriented to accommodate a different rim type by merely rotating the clamp and remounting it on the clamp carrier. Each of the claws comprises a generally J-shaped body having a hook portion for receiving the peripheral edge of a vehicle rim.

12 Claims, 7 Drawing Sheets

DUAL PURPOSE CLAMP FOR RIM HOLDING TIRE CHANGERS

BACKGROUND OF THE INVENTION

The present invention relates generally to rim holding tire changers, and more particularly to clamps used to hold a rim in a fixed relation to the table of a rim holding tire changer while a tire is mounted on or removed from the rim.

The type of equipment for which Applicant's invention is designed is known generally in the industry as a rim holding tire changer. Examples of the type of equipment involved are the rim holding tire changers manufactured by Hennessy Industries, Inc., Applicant's assignee, and marketed under the trademarks "COATS®" and "AMMCO®" including the COATS® models 5030A and the model 5060A-E and 5060AX-EX. Other manufacturers of such equipment include FMC Corporation of Chicago, Ill., Corghi of Correggio, Italy and Sice of Correggio, Italy. Equipment of this type has been readily available in the market for many years, is the subject matter of numerous patents and has been described in a variety of publications, bulletins, brochures, operating and instruction manuals, and the like. One such machine is illustrated in the design patent issued to Applicants as co-inventors in U.S. Design Pat. No. 293,916.

In the normal tire changing procedure, the operator places a rim on the table of the rim holding tire changer and, using the clamp control pedal moves a set of clamps inward or outward to secure the rim to the table. The operator then mounts a tire on the rim by using a mount/dismount head to force the bead of the tire over the rim. Finally, the air chamber of the tire is filled with air to inflate the tire. This procedure is described in detail in U.S. patent application Ser. No. 08/516,129, the substance of which is incorporated herein by reference, and which is assigned to the assignee of the present invention.

Rim holding type tire changers are useful because the inside contour of a tire rim is a controlled surface whereas the center portion of the rim is designated for styling and mounting. Most rim holding machines are capable of servicing all automotive type rims; however, they are limited in range and will not accommodate very large diameter (18"–23") motorcycle type rims or very small diameter (6"–10") utility type rims.

Furthermore, the clamps used to secure a rim to the table are not universally applicable to rims for automobiles, light trucks, motorcycles and all-terrain vehicles ("ATV's"). Thus, a clamp designed for the rim of an automobile or light truck tire will not accommodate the rim of a motorcycle tire. Likewise, a clamp designed for the rim of a motorcycle tire will not accommodate the rim of an ATV tire. To overcome this limitation, adapters are available to enable the conventional automobile rim holding tire changer to also accommodate motorcycle rims and small utility wheel rims.

One drawback associated with these adapters is that the user must purchase two sets of adapters to enable servicing of both of these types of rims. Although the adapters or clamps are easily installed and removed, an operator must manually change the clamps every time the tire on a different type of rim is changed. Thus, a significant amount of time is expended in reconfiguring the tire changer to accommodate a different rim size or type. Because the operator must change the clamps with each different rim size or type, the speed of the operator in a high-volume operation is substantially reduced.

Thus, it will be appreciated by those skilled in the art of designing and manufacturing equipment used to change the tubeless tires that it is desirable to have a single clamp that is capable of accommodating multiple rim types. The present invention provides an alternative clamp configuration that is designed to accommodate more than one type of rim to obviate the problems of prior art devices.

SUMMARY OF THE INVENTION

The present invention is directed to a clamp that can be mounted on a rim holding tire changer in multiple orientations to accommodate the rim of either a motorcycle or an ATV tire. The dual purpose clamp of the present invention enables an operator to quickly adapt the tire changer for these different rim types without having to completely change the clamps. The operator merely reorients the clamp on the clamp carrier to place the claws configured for either a motorcycle or an ATV rim in an operable position with respect to the table of the tire changer.

The clamp of the present invention comprises a base, a body and gripping means or claws for gripping the rim of a vehicle tire. In the preferred embodiment, the base is generally L-shaped and includes perpendicular legs comprising spaced apart walls which define interior channel means. Rail or track means are mounted along inner surface of the walls of each leg, and are configured to cooperatively engage the clamp carrier mounted to the table of a rim holding tire changer. Each leg of the base further includes a bore formed therein and configured to receive a locking pin for releasably securing the clamp to the clamp carrier in the desired position.

First and second claws are attached at an end of the body opposite the base. The first claw is configured to accommodate a first rim type, and the second claw is configured to accommodate a second rim type. The second claw is preferably disposed ninety degrees from the first claw so that the clamp may be reoriented to accommodate a different rim type by merely rotating the clamp and remounting it on the clamp carrier. Each of the claws comprises a generally J-shaped body having a hook portion for receiving the peripheral edge of a vehicle rim.

The components of the clamp may be constructed of any suitable material. The base and body portion are preferably constructed of a rigid metal, and the claws are preferably constructed of a material, such as plastic, rubber, urethane and the like, that will not scratch or mar the tire rim.

DESCRIPTION OF THE PREFERRED EMBODIMENT

Figure 1:
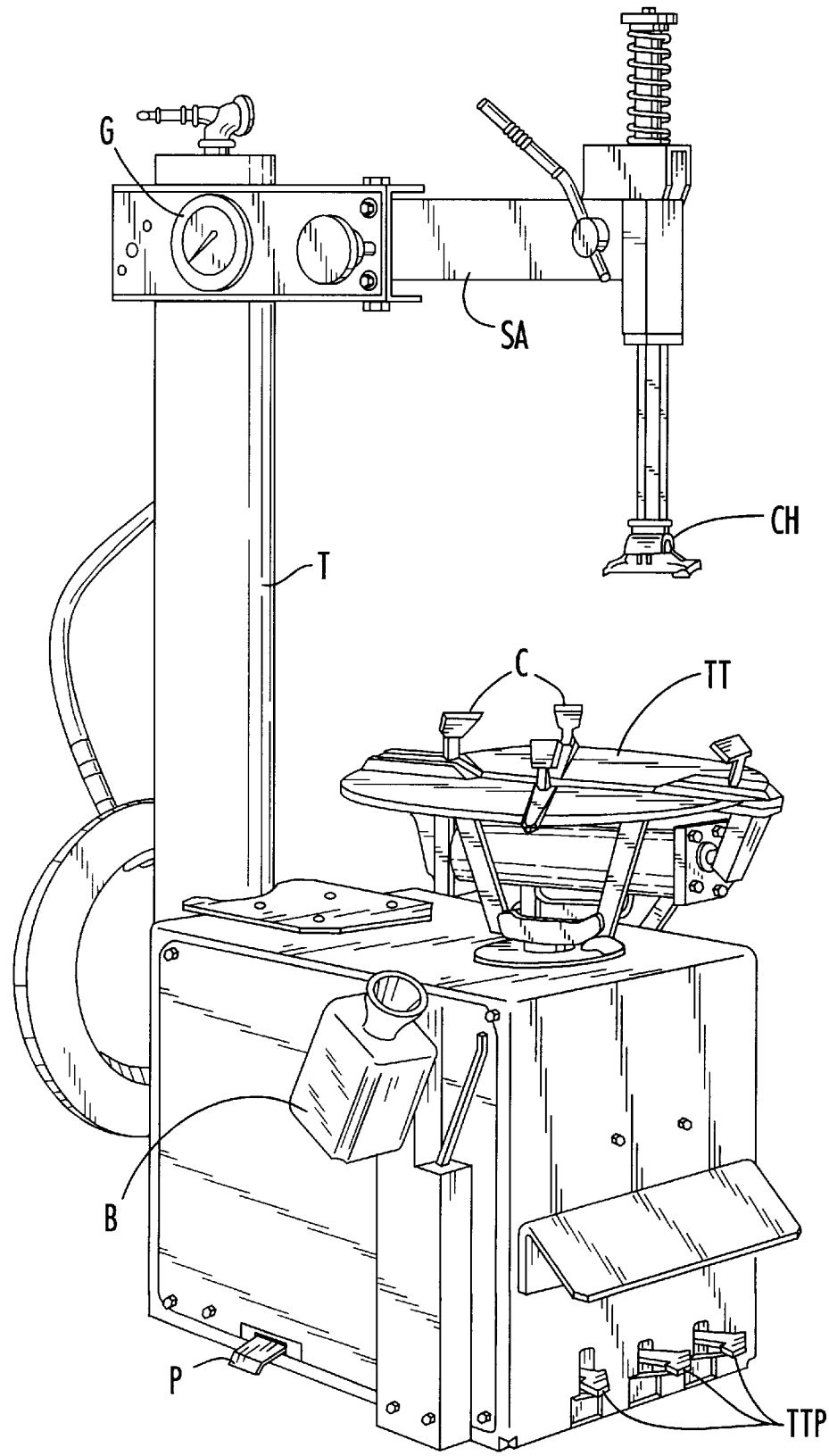
FIG. 1 is a perspective view of a rim holding tire changer.

Applicant's invention will be best understood when considered in light of the following description of the preferred embodiment of the invention, as illustrated in FIGS. 3–7 of the attached drawings wherein like reference numerals refer to like parts.

Figure 2:
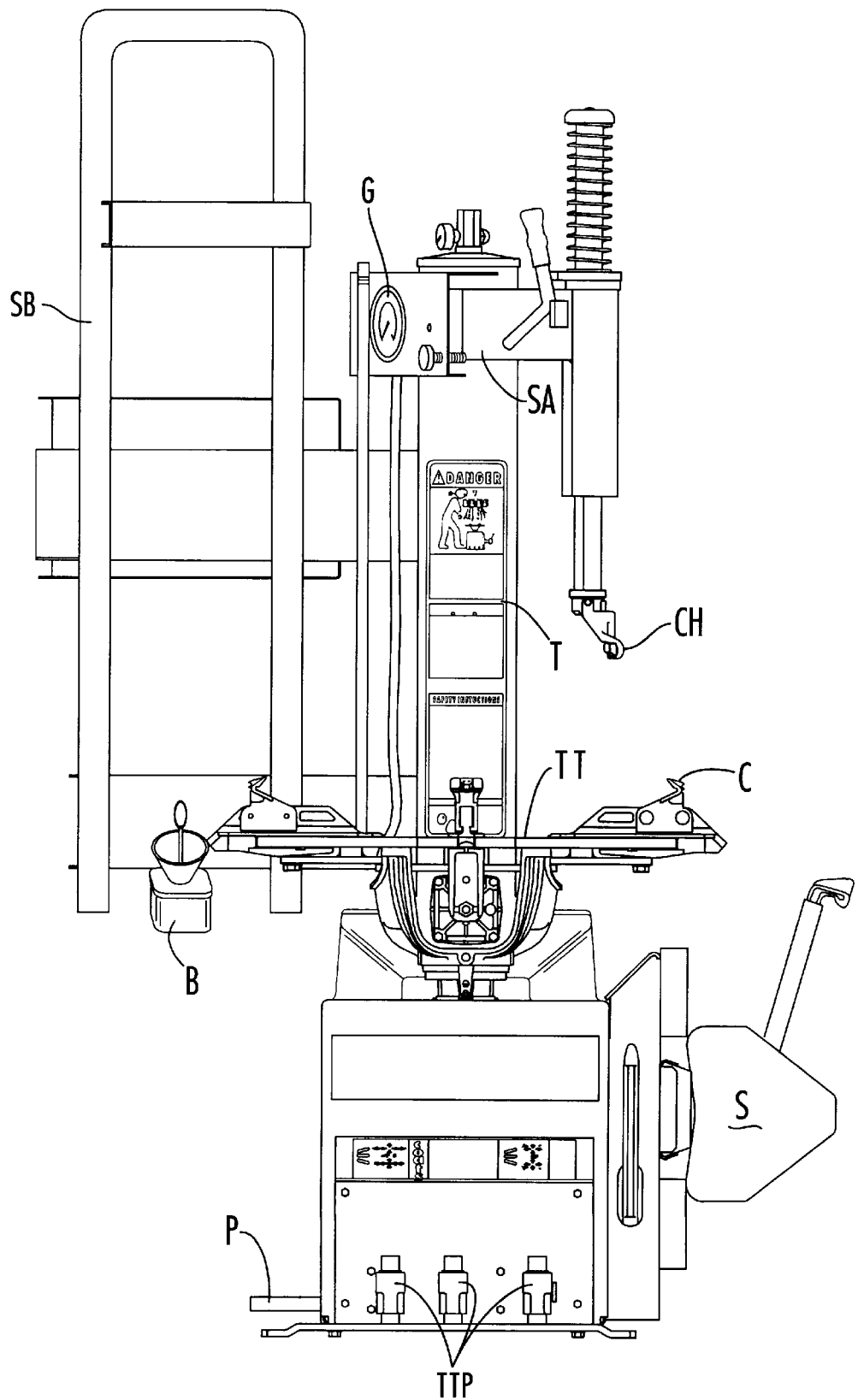
FIG. 2 is a front view of a rim holding tire changer similar to the changer illustrated in FIG. 1 but having a safety barrier.

With reference to FIGS. 1 and 2, a typical rim holding tire changer includes a tower T, an air gauge G, an inflation pedal P, a table top TT, clamps C, a lube bottle B, a combination mount/dismount head CH, a swing arm SA, table top pedals TTP, a carrier arm CA for the bead loosener shoe S, a bead loosener shoe S and, in some cases, a safety barrier SB.

Figure 3:
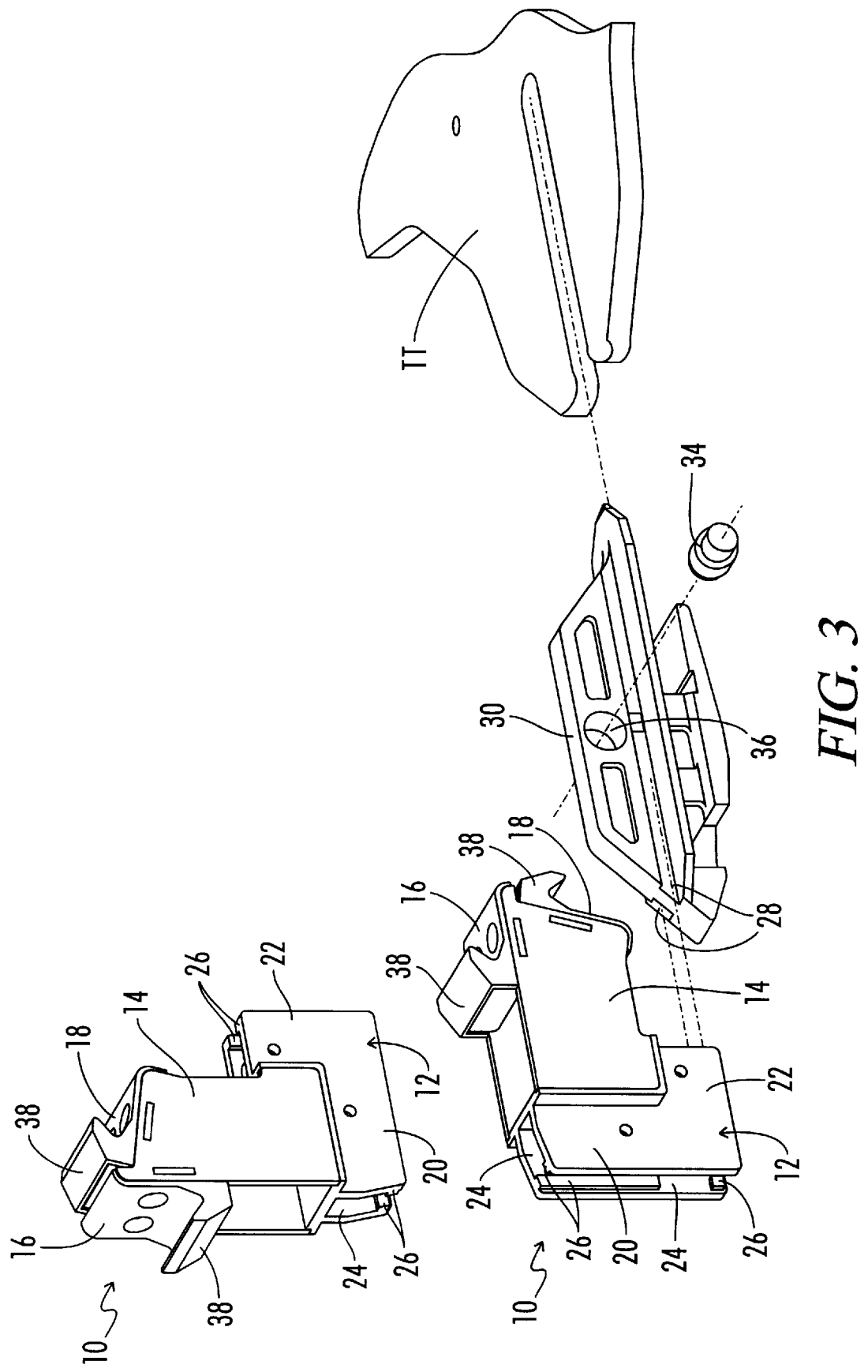
FIG. 3 is a partial exploded view of the table and clamp carrier of a rim holding tire changer showing the dual purpose clamp of the present invention in alternate positions to accommodate the rims of an ATV tire or a motorcycle tire.

The dual purpose clamp of the present invention is designated generally by reference numeral 10 in FIG. 3. The clamp 10 comprises a base 12, a body 14 and gripping means 16 and 18. In the preferred embodiment, the gripping means comprises a first claw 16 mounted to the body 14 and configured to engage the rim R1 of a first type of vehicle, such as a utility vehicle or ATV, and a second claw 18 mounted to the body and disposed ninety degrees from the first claw 16. The second claw 18 is configured to engage the rim R2 of a second type of vehicle, such as a motorcycle. It is also contemplated that the first and second claws 16 and 18 be configured to accommodate other types of vehicle rims, so long as the first and second rim types are different.

The base 12 is generally L-shaped and includes first and second legs 20 and 22, respectively. In the preferred embodiment, the first leg 20 is slightly longer than the second leg 22, the legs 20 and 22 constitute two attached means oriented at an angle to each other for attaching the dual purpose clamp to a clamp carrier. The legs 20 and 22 of the base 12 comprise spaced apart walls which define interiorly disposed, perpendicular channel means 24. Rail means 26 are mounted along a portion of the inner surface of the walls of each of the legs 20 and 22. The rail means 26 are configured to cooperatively and slidably engage oppositely disposed channels 28 formed on a clamp carrier 30, which is mounted on the table TT of the tire changer. Each leg 20 and 22 of the base 12 includes a bore 32 formed therein that is configured to receive a locking pin or button 34 for releasably securing the clamp 10 to the clamp carrier 30. Accordingly, either of the bores 32 may be aligned with a bore 36 formed in the clamp carrier 30, and the locking pin 34 inserted therethrough to secure the clamp 10 to the clamp carrier 30 in the selected position.

In the preferred embodiment, the body 14 is elongated and includes a longitudinal axis that is perpendicular to the longer leg 20 of the base 12. The body 14 may be formed as part of the base 12 or, alternatively, the body 14 may comprise a separate component affixed to the base 12 at one end. The claws 16 and 18 are mounted to the body 14 at an end opposite the base 12. The first claw 16, which is preferably configured to receive the rim of an ATV tire, is oriented on the body 14 such that the claw 16 is in operable alignment with respect to the table TT and is positioned to receive the ATV rim when the rail means 26 of leg 22 are in operable engagement with the clamp carrier 30 (see FIG. 4). The second claw 18, which is preferably configured to receive the rim of a motorcycle tire, is oriented on the body 14 such that the claw 18 is in operable alignment with respect to the table TT and is positioned to receive the motorcycle rim when the rail means 26 of leg 20 are in operable engagement with the clamp carrier 30 (see FIG. 5). Thus, in the preferred embodiment, the second claw 18 is oriented ninety degrees from the first claw 16. However, other operable angular orientations of the first claw 16 relative to the second claw 18 are contemplated to be within the scope of the present invention.

Figure 6:
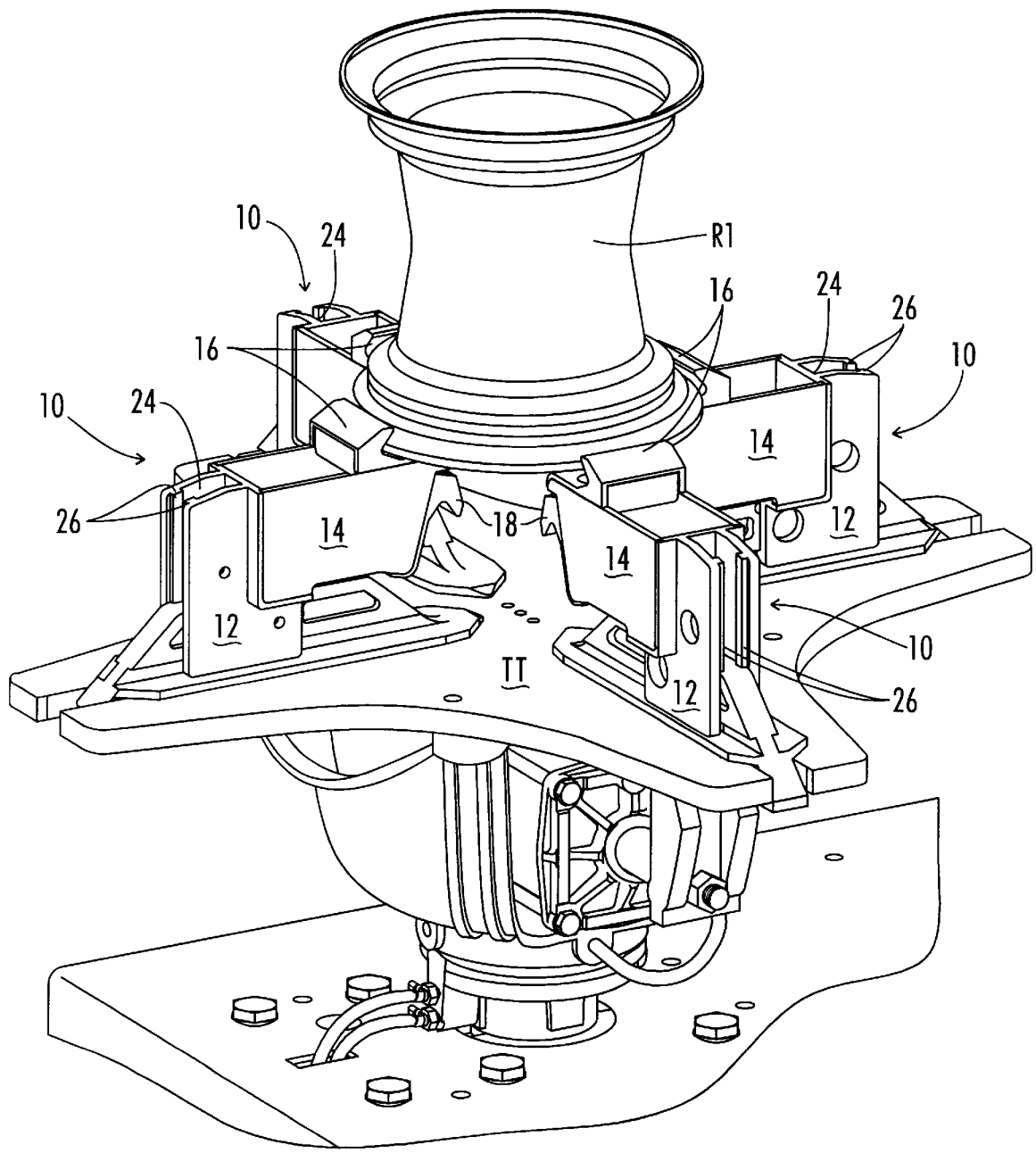
FIG. 6 is a partial perspective view of a rim holding tire changer showing the rim of an ATV wheel mounted on the dual purpose clamps of the present invention.
Figure 7:
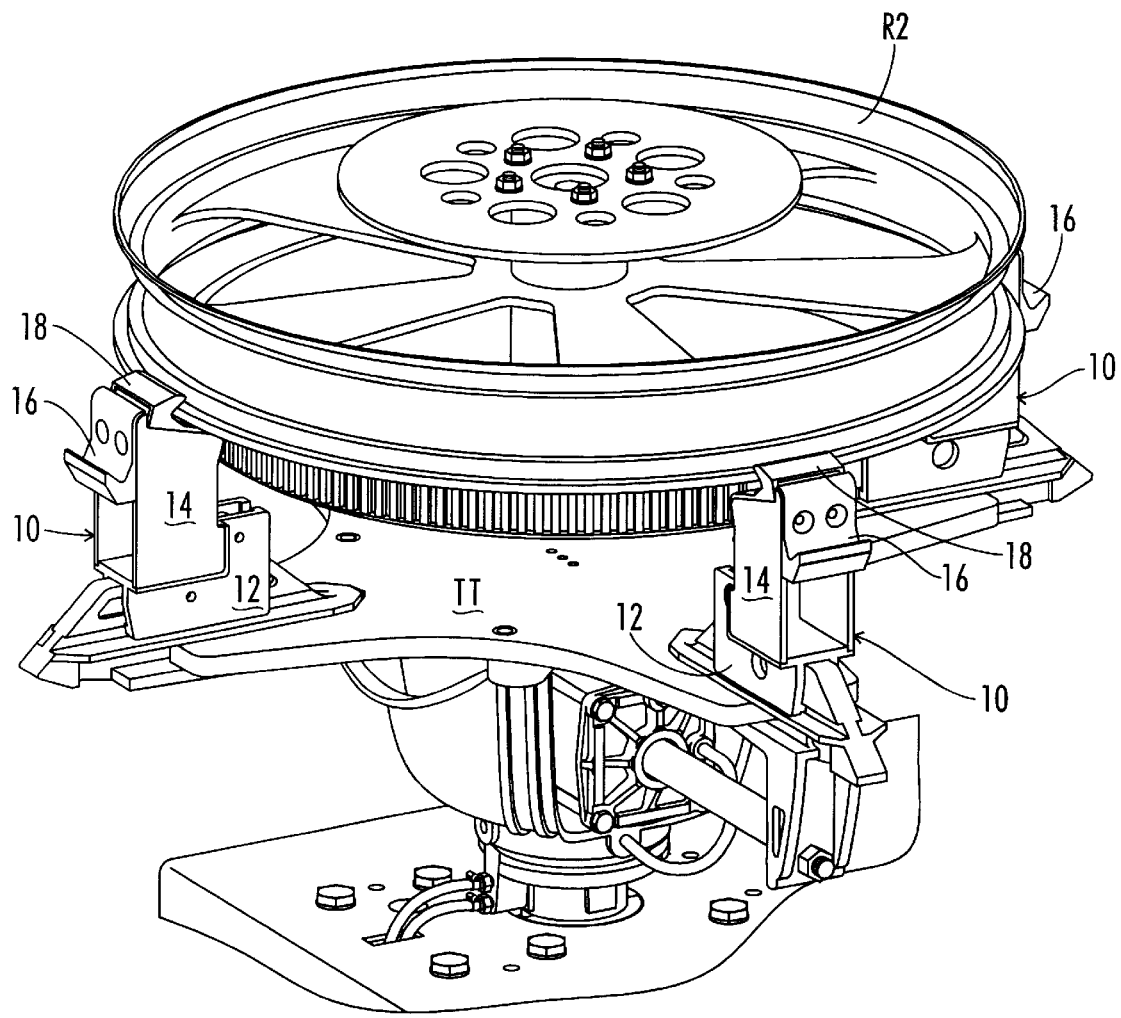
FIG. 7 is a partial perspective view of a rim holding tire changer showing the rim of a motorcycle tire mounted on the dual purpose clamps of the present invention.

With respect to FIGS. 6 and 7, each of the first and second claws 16 and 18 comprise a generally J-shaped body having a hook portion 38, which is configured to engage the tire rim such that the peripheral edge of the rim is seated therein.

MODE OF OPERATION

Figure 4:
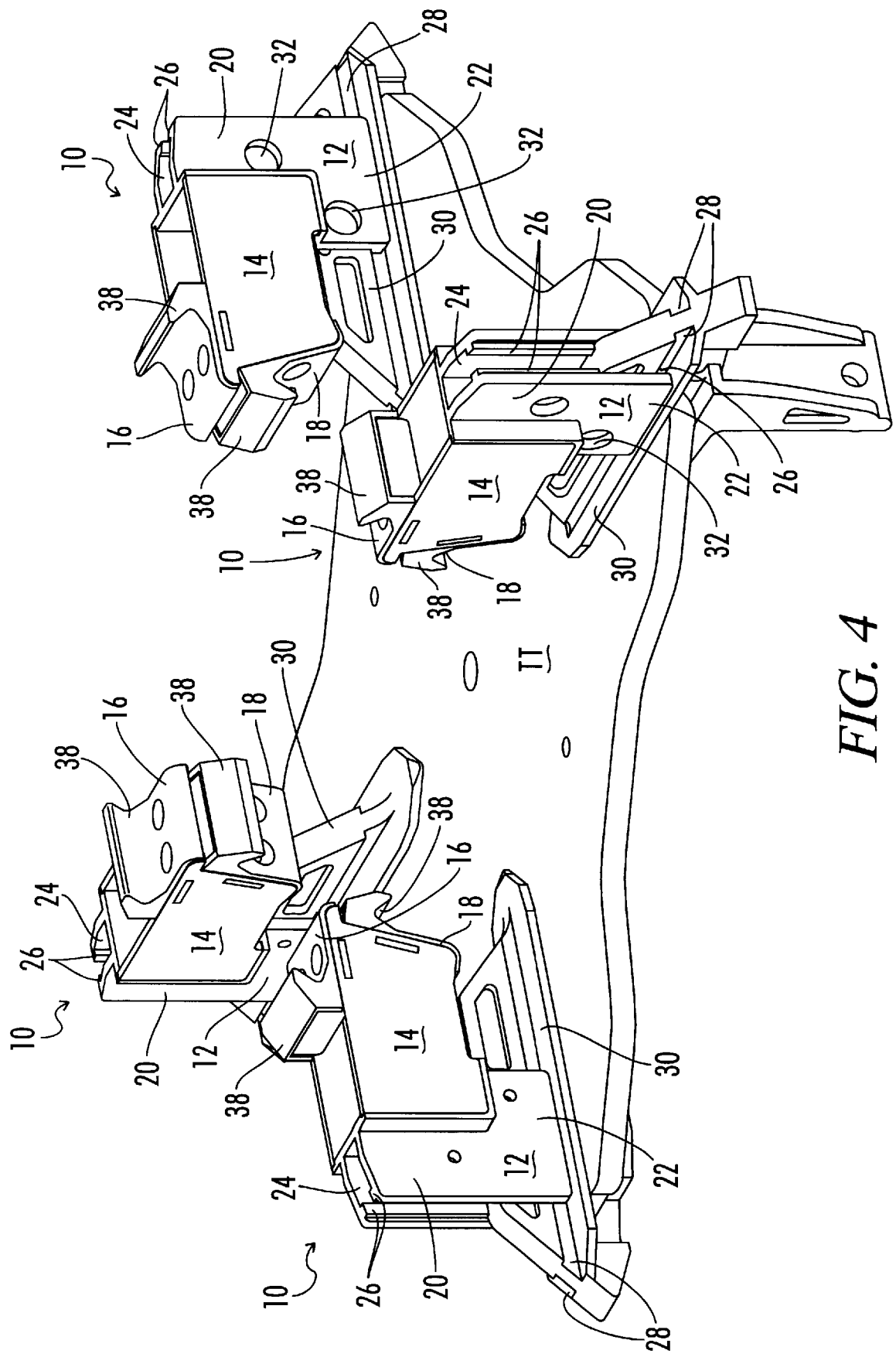
FIG. 4 is a partial perspective view of a rim holding tire changer showing the clamp operably mounted thereto in a position to accommodate the rim of an ATV tire.
Figure 5:
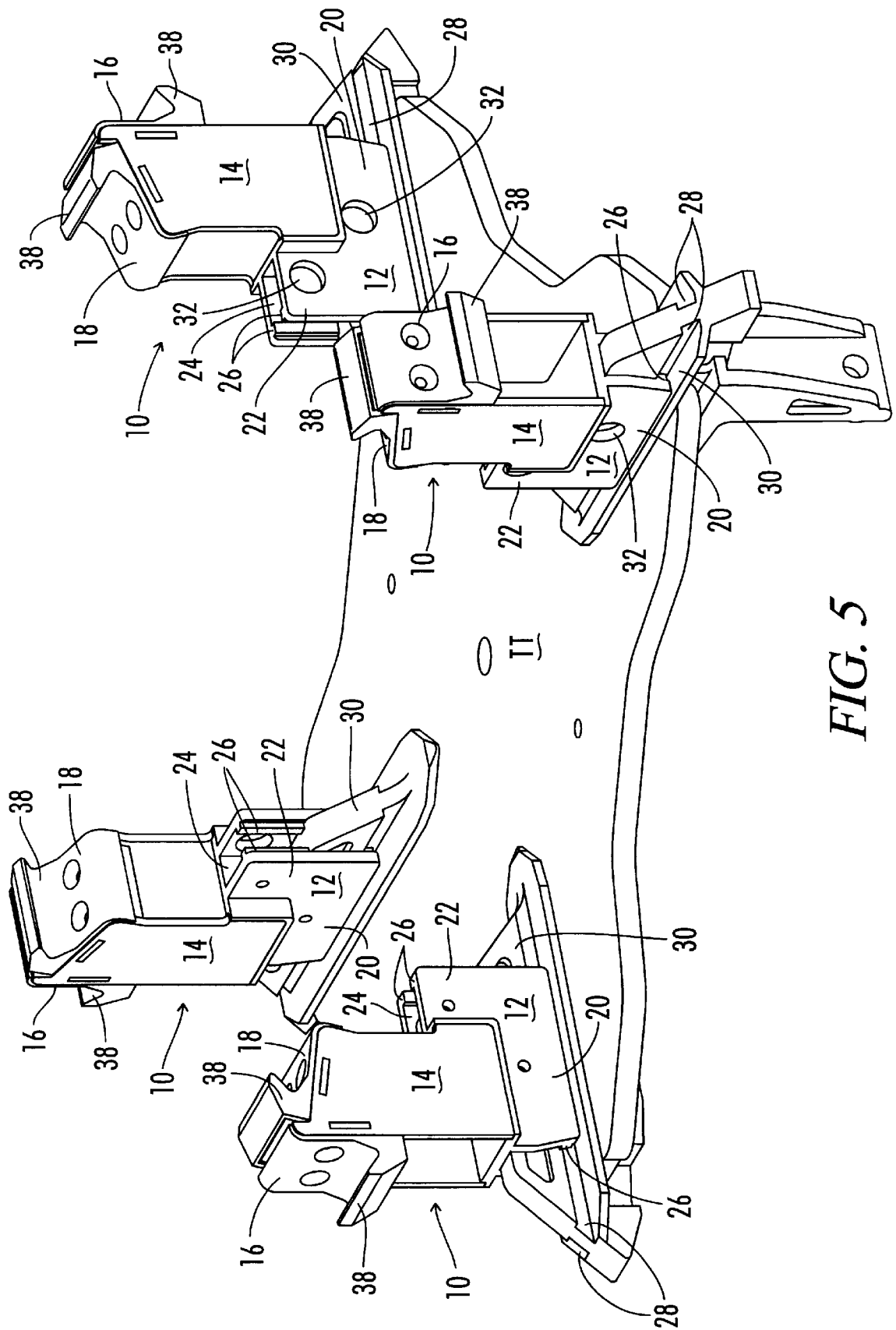
FIG. 5 is a partial perspective view of a rim holding tire changer showing the clamp operably mounted thereto in a position to accommodate the rim of a motorcycle tire.

To use the dual purpose clamp 10 of the present invention, the operator determines the mounting orientation of the clamp 10 in accordance with the type of tire to be changed, e.g., utility vehicle or motorcycle. The operator then mounts a set of clamps 10 on the clamp carriers 30 such that the appropriate claws 16 or 18 are properly oriented to receive the vehicle rim that is to be mounted thereon. Thus, if the operator desires to change the tire of a utility vehicle, the clamps 10 are mounted on the clamp carriers 30 as shown in FIG. 4. On the other hand, if the operator desires to change the tire of a motorcycle, the clamps 10 are mounted on the clamp carriers 30 in an upright position as shown in FIG. 5. Once the clamps 10 are properly oriented, the operator can proceed with the normal tire changing procedure.

The operator can easily alternate between configuring the clamps 10 to accommodate utility vehicle rims or motorcycle rims by simply releasing the locking button 34 on each clamp 10 and rotating the clamp 10 to place the alternate claw 16 (or 18) in an operable position.

Thus, although there have been described particular embodiments of the present invention of a new and useful dual purpose clamp for rim holding tire changers, it is not intended that such references be construed as limitations upon the scope of this invention except as set forth in the following claims. Further, any dimensions used in the preferred embodiment are not intended to be construed as limitations upon the scope of the claims except as set forth in the following claims.

What we claim is:

1. In combination, a rim clamp and a rim holding tire changer having a clamp carrier, comprising:

a rim clamp including a base having two sets of legs, one set of legs being perpendicular to the other set of legs, each set of legs being attachable to the clamp carrier of the rim holding tire changer independent of the other set of legs;

a body affixed to the base; and gripping means attached to the body for receiving the rim of a vehicle tire, the gripping means including a first claw configured to receive a first rim type, and a second claw angularly disposed from the first claw and configured to receive a second rim type that is different from the first rim type.

2. The clamp of claim 1, further comprising:

means for releasably securing the clamp to the clamp carrier.

3. The clamp of claim 1, wherein legs of the base comprise spaced apart walls defining a channel.

4. The clamp of claim 3, wherein the channel further comprises:

rail means mounted along an inner surface of the walls.

5. The clamp of claim 1, wherein the first and second claws each comprise a body having a hook portion for receiving the outer peripheral edge of a tire rim.

6. A dual purpose clamp for use with a rim holding tire changer, comprising:

base means for attaching said clamp to a clamp carrier of a rim holding tire changer;

a body extending from said base and having first and second claw means mounted thereto;

said base means including two attachment means oriented at an angle to each other for attaching said dual purpose clamp to a clamp carrier of a rim holding tire changer whereby the first claw means is oriented to operably receive a first rim type when one of said two attachment means is attached to the carrier clamp, and the second claw means is oriented to receive a second rim type when the other of said two attachment means is attached to the carrier clamp, with said dual purpose clamp being oriented at one angle relative to said clamp carrier when one of said two attachment means is attached to the carrier clamp and at a second, different angle relative to said clamp carrier when the other of said two attachment means is attached to the carrier clamp.

7. The clamp of claim 6, wherein the second position is disposed ninety degrees from the first position.

8. The clamp of claim 6, wherein each of said two attachments means includes:

a pair of legs comprising spaced apart walls defining an interior channel.

9. The clamp of claim 8, wherein the channel means further comprise:

rail means for cooperatively engaging a clamp carrier.

10. The clamp of claim 6, further comprising:

means for releasably securing the clamp to the clamp carrier.

11. The clamp of claim 10, wherein said two attachment means are each a pair of spaced apart legs extending from the base; and the securing means comprises:

a bore formed in at least one of the legs of each of said pair of legs; and a locking pin selectively insertable through either of the bores.

12. The clamp of claim 6, wherein the first and second claw means further comprise:

a body having a hooked end for receiving the peripheral edge of a vehicle tire rim.

* * * * *